METHINE DYES

Franz Marschall and William W. Williams, Easton, Pa., assignors to General Aniline & Film Corporation, New York, N. Y., a corporation of Delaware No Drawing. Application December 30, 1953, Serial No. 401,364

7 Claims. (Cl. 260—240)

This invention relates to the production of novel methine dyestuffs, and more particularly to dyestuffs corresponding to the general formula

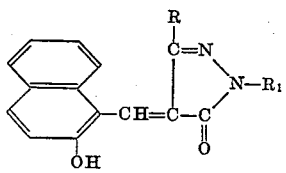

wherein R is selected from the group consisting of hydrogen, lower alkyl, carbalkoxy and carboxy, and $R_1$ is selected from the group consisting of hydrogen, lower alkyl and aryl.

It is well known that most methine type dyes are not readily adapted for the coloration of plastics, resin and lacquer coatings, lithographic printing inks and the like, because they suffer the disadvantage of being too soluble in the common organic solvents. The properties of nonbleeding, good light fastness, and good brightness for use as daylight colors have been considered as desiderata.

It is an object of this invention to provide novel methine dyestuffs which are suitable for the coloration of plastics, resin and lacquer coatings, lithographic printing inks and the like. It is another object of this invention to provide such methine dyestuffs which do not bleed excessively, and have bright daylight shades of good light fastness. Still another object of this invention is the provision of a method for producing such dyestuffs. Other objects and advantages will appear as the description proceeds.

It has been found that the above objects may be attained by means of the group of methine dyestuffs corresponding to the general formula given above, which may be prepared by condensing 2-hydroxy-1-naphthaldehyde with a pyrazole-5-one in which the methylene group in the 4-position is unsubstituted, i. e., having the formula

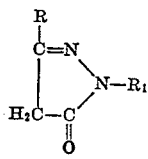

wherein R and $R_1$ have the values given above.

In carrying out the condensation, it is preferred to heat the reactants in the presence of a catalyst and an inert liquid diluent. The preferred diluent is methanol, but other diluents may be employed, as for example ethanol, isopropanol, acetone, benzene, toluene, cyclohexanol, cyclohexanone, pyridine, morpholine, dimethylaniline, dibutyl ether and the like. The condensation is preferably carried out by simply heating the mixture, as by refluxing, for a suitable period of time until the condensation is completed. In general, the reaction may be carried out at room temperature up to 120° C. or more. In some instances, the diluent, when used, may serve also as a catalyst for the condensation involved. While an excess of one of the reactants may in some instances be desirable, it is in general preferred to employ equimolar amounts to avoid the necessity of removing the excess unreacted material.

As the catalyst to be employed in the process of this invention, piperidine is preferred because of its superiority with respect to increasing the speed of reaction and other catalytic properties. Other catalysts, however, may be used, as for example diethylamine, alkali metals, alkali metal alcoholates, carbonates and acetates, pyridine and the like. The amount of catalyst to be employed should be sufficient to effect complete condensation between the reactants present. In general, about 2 per cent to about 4 per cent of the catalyst by weight of the 2-hydroxy-1-naphthaldehyde is adequate to produce the results desired.

In carrying out the condensation, approximately equimolar amounts of the 2-hydroxy-1-naphthaldehyde and the pyrazole-5-one are employed. The preferred pyrazole-5-one is 1-phenol-3-methyl-5-pyrazolone, but other pyrazole-5-ones may also be employed, as for example 1-phenyl-3-carbomethoxy-5-pyrazolone, 1-phenyl-3-carbethoxy-5-pyrazolone, 1-phenyl-3-carboxy-5-pyrazolone, 1-p-tolyl-3-methyl-5-pyrazolone, 3-methyl-5-pyrazolone, 5-pyrazolone, 1,3-dimethyl-5-pyrazolone, 1-(p-chlorophenyl)-3-methyl-5-pyrazolone, 1-(p-nitrophenyl)-3-methyl-5-pyrazolone, 1-(o-methoxyphenyl)-3-methyl-5-pyrazolone, 1-(m-aminophenyl)-3-carboxy-5-pyrazolone, 1-methyl-5-pyrazolone, 1-phenyl-5-pyrazolone, 3-carboxy-5-pyrazolone and the like. It will be understood that the radicals in the R and $R_1$ groups above defined may contain inert substituents which do not interfere with the desired reaction.

As has been stated above, the preferred method of carrying out the condensation is in the presence of an inert liquid diluent. However, in some instances, it is feasible to carry out the condensation in the absence of a diluent by heating the mixture of reactants and catalyst at a temperature sufficient to maintain the reaction mass in a liquid condition until the condensation is completed. This manner of operation has certain operational and economical advantages including elimination of certain purification steps, use of smaller size equipment, reduction of certain fire and health hazards involved in the use of liquid diluents and the like.

The subject dyestuffs produced in accordance with this invention have good ketone solubility and bright colors having good light fastness properties whereby they may be employed in coloring plastics, resin and lacquer coatings, lithographing printing inks and the like.

The following examples in which parts are by weight unless otherwise indicated, are illustrative of the instant invention and are not to be regarded as limitative.

Example 1

43.0 parts of 2-hydroxy-1-naphthaldehyde, 215 parts of methanol and 1 part of piperidine are heated to reflux and a methanolic solution of 43.5 parts of 1-phenyl-3-methyl-5-pyrazolone are added. The mixture is refluxed for 1 hour, then cooled, filtered and the precipitate washed with methanol.

A good yield of a reddish-yellow dyestuff is obtained which shows no fading after 24 hours in the Fadeometer, having the formula

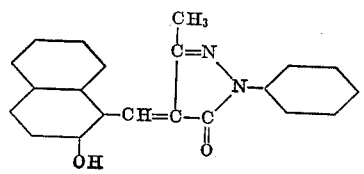

Example II 4.3 parts of 2-hydroxy-1-naphthaldehyde, 40 parts of methanol and 0.22 parts of piperidine are heated to reflux and a solution of 5.1 parts of 1-phenyl-3-carboxy-5-pyrazolone in 120 parts of methanol. The mixture is refluxed for 2½ hours, then cooled, filtered and the yellow-orange precipitate washed with methanol. The dyestuff of good solubility, brightness and light-fastness properties, has the formula

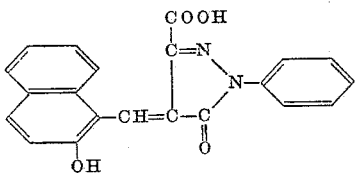

Example III

The procedure of Example II is repeated except that the piperidine is omitted. The yellow-orange precipitate which is isolated is substantially the same as the product of Example II.

The products of Examples II and III may be converted to ammonium, alkali metal, heavy metal and alkali earth metal salts, if desired, by treatment with an appropriate base or salt.

This invention has been described with respect to certain preferred embodiments thereof, but various modifications and variations within the spirit and scope of the invention will become obvious to those skilled in the art. It is accordingly to be understood that such modifications and variations are to be considered as included within the purview of this application and the scope of the appended claims.

We claim:

1. A compound having the formula

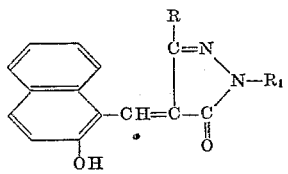

wherein R is selected from the group consisting of hydrogen, lower alkyl, carbalkoxy and carboxy and $R_1$ is selected from the group consisting of hydrogen, lower alkyl and carbocyclic aryl.

2. A compound having the formula

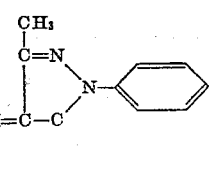

3. A compound having the formula

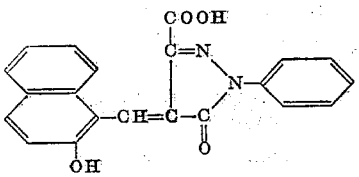

4. A process for producing a compound as defined in claim 1 by condensing 2-hydroxy-1-naphthaldehyde with about an equimolar amount of a pyrazole-5-one in which the methylene group in the 4-position is unsubstituted.

5. A process for producing a compound as defined in claim 1 by condensing 2-hydroxy-1-naphthaldehyde with about an equimolar amount of a compound having the formula

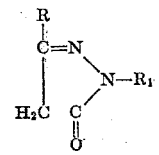

in which R is selected from the group consisting of hydrogen, lower alkyl, carbalkoxy and carboxy and $R_1$ is selected from the group consisting of hydrogen, lower alkyl and carbocyclic aryl.

6. A process for producing a compound as defined in claim 2 by condensing 2-hydroxy-1-naphthaldehyde with about an equimolar amount of 1-phenyl-3-methyl-5-pyrazolone.

7. A process for producing a compound as defined in claim 3 by condensing 2-hydroxy-1-naphthaldehyde with about an equimolar amount of 1-phenyl-3-carboxy-5-pyrazolone.

References Cited in the file of this patent

UNITED STATES PATENTS

| | | |
|---|---|---|
| 2,028,141 | Ackerman | Jan. 21, 1936 |
| 2,036,546 | Schneider | Apr. 7, 1936 |